United States Patent [19]
Monahan

[11] 4,057,828
[45] Nov. 8, 1977

[54] CONTRAST COMPRESSION CIRCUITS

[75] Inventor: John F. Monahan, Quincy, Ill.

[73] Assignee: Harris Corporation, Cleveland, Ohio

[21] Appl. No.: 632,181

[22] Filed: Nov. 17, 1975

[51] Int. Cl.² .................. H04N 9/53; H04N 5/20; H04N 5/535

[52] U.S. Cl. .................. 358/32; 358/164; 358/169

[58] Field of Search .......... 178/DIG. 12, DIG. 16, 178/7.1, 7.2; 358/32, 164, 166, 167, 27, 36, 37, 169; 333/14; 328/167, 168; 307/229, 230

[56] References Cited

U.S. PATENT DOCUMENTS

| | | | |
|---|---|---|---|
| 3,333,055 | 7/1967 | Krause | 178/DIG. 12 |
| 3,602,737 | 8/1971 | Radecke | 178/DIG. 12 |
| 3,604,841 | 9/1971 | Ettlinger et al. | 358/32 |
| 3,684,825 | 8/1972 | Dischert | 178/DIG. 16 |
| 3,715,477 | 2/1973 | Olson et al. | 178/DIG. 12 |

Primary Examiner—John C. Martin

[57] ABSTRACT

An amplitude compression circuit for de-emphasizing variations in amplitude of a wide band electrical signal. A gamma circuit is used to compress amplitude variations in the wide band signal. A linear signal is subtracted from the compressed signal, producing a difference signal which represents the portion of the compressed signal resulting from the compression process. The difference signal is multiplied by a controlled factor and then added back to the unprocessed wide band signal to produce a second compressed signal. By varying the controlled multiplication factor, the amount of compression of the second compressed signal is linearly and controllably altered. To prevent emphasizing the noise portion of the signal, the wide band signal is cored before processing by the compression difference circuit. The coring circuit removes noise by subtracting the low amplitude, high frequency portion from the wide band signal. To reduce the high frequency loss inherent in coring, the wide band signal to which the multiplied difference signal is added is uncored.

5 Claims, 4 Drawing Figures

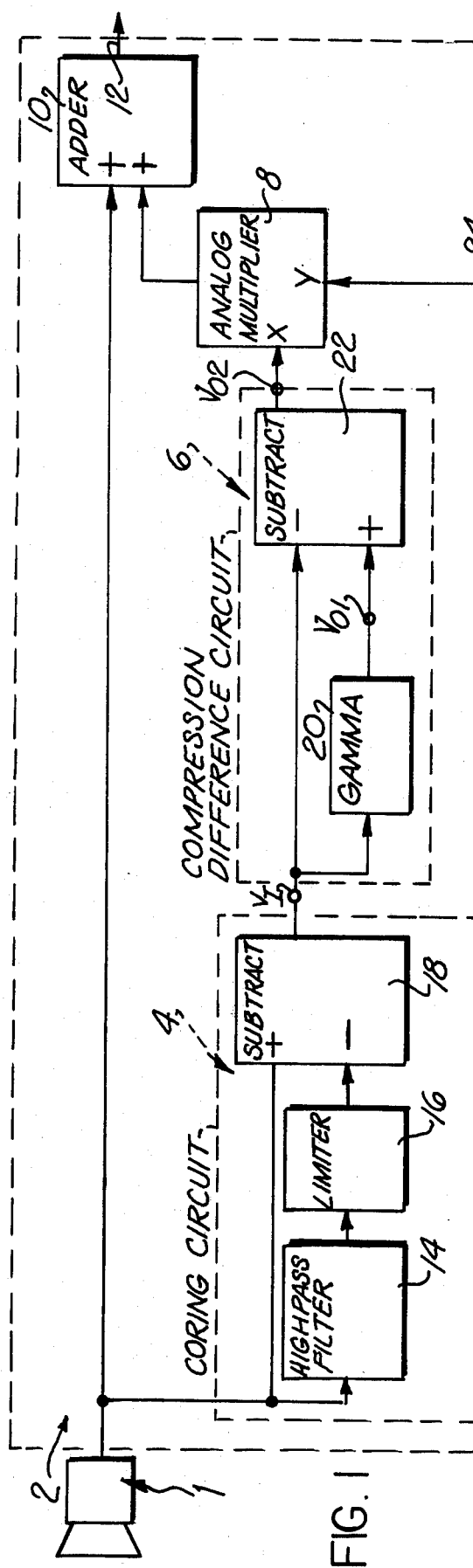
FIG. 1
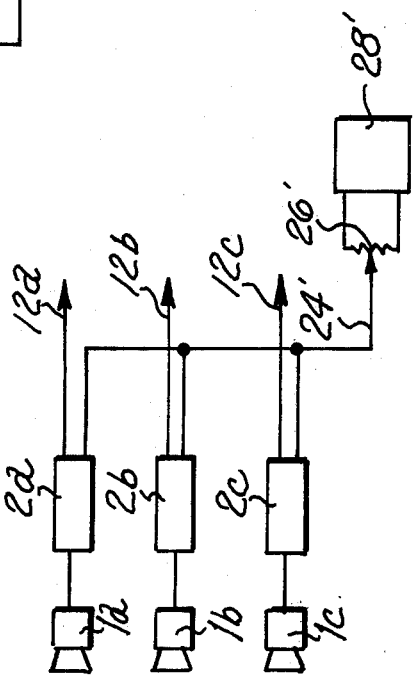
FIG. 2a
FIG. 2b
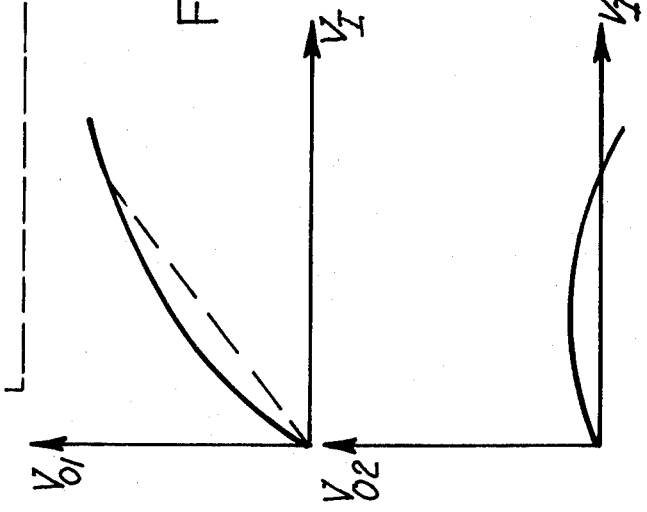
FIG. 3

10

CONTRAST COMPRESSION CIRCUITS

The present invention relates to the art of amplitude compression of wide band electrical signals and more particularly to the art of contrast compression of video signals.

In the operation of television cameras, problems arise in the sensing and display of high contrast scenes. A classic example thereof is a late afternoon football game where half of the field is shrouded in deep shadow while the remainder is brightly lit. The overall video system is capable of only a limited transfer characteristic. Therefore, in a subsequent display of the signal produced thereby, the shadowed portion will appear totally dark and the brightly lit portion will be washed out. To prevent the loss of detail inherent in such display, the signal produced by the imaging transducer must first be processed to narrow the contrast range represented thereby. This process, known in the art as contrast compression, acts to lighten dark areas and darken light areas by de-emphasizing amplitude variations of the video signal.

Several difficulties arise in such signal processing. By enhancing, or "stretching", the amplitude of low level signals, the noise component of the signal is also enhanced. To prevent degradation of the displayed image, this noise component must be removed. Video signal noise is largely of low amplitude and is concentrated in the high frequency portion of the video signal spectrum. Thus, "coring" circuits have been employed which remove the high frequency, low amplitude portion of the video signal. Typically this is achieved by first separating the signal into high and low frequency portions. The high frequency portion is then directed through a threshold sensitive circuit which passes only signals above a certain amplitude. The output, which includes only high amplitude, high frequency signals, is then added back to the low frequency portion to provide a noise filtered video signal at its output.

Alternately, the high frequency portion can be directed through a limiter which passes only low amplitude signals. This high frequency, low amplitude signal, comprising mainly the noise component of the video signal, is then subtracted from the video signal. This technique is preferable because limiters are generally less sensitive to component variations than threshold circuits.

Since the coring process acts to discard all low amplitude signals, some low level, high frequency, image information is lost, as well. This removal of high frequency information translates into a loss of sharpness or detail on the displayed image. The loss is most pronounced in dark areas of the displayed scene, where much of the image signal is of low amplitude. Therefore, scenes including highly contrasting areas may exhibit noticeable differences in sharpness and clarity across the displayed image.

Amplitude compression of the video signal is performed by circuits known in the art as gamma circuits. The amplitude of the output signal of a gamma circuit commonly is approximately proportional to the input signal to the gamma power. One method of achieving this is to modulate the current through a diode in response to the input signal and amplifying the voltage developed across the diode to provide the output signal. In practice these gamma circuits have variable stretching factors to allow the operator to adjust the contrast compression to the needs of the moment.

In color television cameras contrast compression can be inserted in two ways. A gamma circuit can be connected following the colorplexing stage to compress the composite video signal. Problems arise, however, in the production of unwanted side bands of the color signal due to the presence of the gamma circuit. A second method includes providing gamma circuits for each of the three imaging tubes in the color television camera. Since the color composition of the subsequent colorplexed signal must not vary, the variable stretching factors of the gamma circuits must be uniformly and simultaneously controlled in accordance with a single "picture" gamma.

Therefore, it is an object of the present invention to provide apparatus for amplitude compression of a video signal including coring but without substantial loss of high frequency information.

It is another object of the present invention to provide variable contrast compression apparatus for television imaging tubes which can be varied by a single control signal.

It is yet another object of the present invention to provide variable contrast compression apparatus for a color television camera including contrast compression circuits for each of the several color imaging tubes where the compression factors of all circuits can be varied uniformly and simultaneously by a picture gamma control voltage common to the circuits.

In accordance with the present invention, amplitude compression apparatus is provided for the processing of wide band electrical signals. The wide band signal is first cored to remove noise. A compression difference signal is then developed by processing the wide band signal with a conventional gamma circuit and subtracting the wide band signal from the processed signal. An analog multiplication circuit receives the difference signal and multiplies it by a picture gamma control signal. The controlled difference signal is then added back to the uncored wide band signal to provide the amplitude compressed wide band signal. Compression is thus easily controlled by varying the factor by which the difference signal is multiplied.

DESCRIPTION OF THE PREFERRED EMBODIMENT

Still further objects and advantages of the invention will become more readily apparent to those skilled in the art from the following description of the preferred embodiment of the invention, as taken in conjunction with the accompanying drawings which are a part hereof and wherein:

FIG. 1 is a block diagram of the preferred embodiment of the invention.

FIG. 2a is a graph of the transfer characteristics of a typical gamma circuit.

FIG. 2b is a graph of the transfer characteristics of the compression difference circuit.

FIG. 3 illustrates the use of the invention with a plurality of imaging tubes.

Referring specifically to FIG. 1, wide band signal source 1 has an output which is processed by contrast compression circuit 2.

The invention is comprised generally of a coring circuit 4, compression difference circuit 6, multiplication circuit 8, and adder circuit 10, to provide an output 12. Wide band signal source 1 may be a video imaging tube or any similar signal source.

Noise reduction is accomplished with coring circuit 4 comprised generally of high pass filter 14, limiter 16 and subtraction circuit 18. The wide band signal passes first to high pass filter 14 which extracts the high frequency portion from the wide band signal, while discarding the low frequency portion. This high frequency portion is directed to limiter 16 which operates to clip high amplitude signals. Therefore, the output of limiter 16 is the low amplitude, high frequency portion of the wide band signal. It is this signal which constitutes the majority of the noise contained in the wide band signal. The wide band signal and the noise signal are directed to a subtraction circuit 18 which subtracts the output signal of limiter 16 from the wide band signal to produce a noise filtered signal at its output.

Compression difference circuit 6 includes a gamma circuit 20 which compresses the signal. The subtraction circuit 22 then subtracts the uncompressed signal from the compressed signal to provide a compression difference signal which corresponds to the nonlinear response of gamma circuit 20.

The operation of the compression difference circuit can be further understood through reference to FIGS. 2a and 2b. In FIG. 2a, the solid line depicts the nonlinear transfer characteristic of gamma circuit 20. The dotted line indicates the linear portion of the signal which is removed by subtraction circuit 22. FIG. 2b shows the net transfer characteristics of the compression difference circuit.

Potentiometer 26 is connected across voltage source 28, thus developing gamma control signal 24 at the wiper arm thereof. The output of subtraction circuit 18 is multiplied together with the gamma control signal 24 by analog multiplication circuit 8 thereby providing a variable control of the compression difference signal. This controlled compression difference signal is then added back with a wide band signal through adder circuit 10 to produce a second compressed signal on the output line 12.

Since the wide band signal going into adder 10 has not been cored, no high frequency information has been deleted therefrom. The compression difference signal, however, has been cored, therefor any stretching of the wide band signal is relatively noise free.

The amount of compression is easily controlled through variation of gamma control signal 24, thus simplifying picture gamma control in television cameras having a plurality of signal sources. Thus, as shown in FIG. 3, a television camera has a plurality of wide band signal sources 1a, 1b, and 1c, each corresponding to signal source 1 of FIG. 1. By way of example, these signal sources may be the red, blue and green imaging tubes of a color television camera, along with their associated signal processing circuitry. The signal sources each have their own respective compression circuit 2a, 2b, and 2c, each corresponding with compression circuit 2 of FIG. 1. These compression circuits are jointly controlled by a common picture gamma control signal 24' obtained from the wiper arm of potentiometer 26'. The potentiometer is once again connected across a voltage source 28'. Gamma control of the three circuits is therefore simultaneous and uniform.

Although the invention has been described in conjunction with a preferred embodiment, it is to be appreciated that various modifications and arrangements of parts may be made without departing from the spirit and scope of the invention as defined by the appended claims.

Having thus described my invention, I claim:

1. An amplitude compression circuit for de-emphasizing variations in amplitude of a wide band electrical signal, comprising:
    coring means responsive to said wide band signal for noise reduction of said signal by high frequency coring to produce a noise filtered signal;
    difference signal source means responsive to said noise filtered signal for producing a compression difference signal corresponding to the difference between said noise filtered signal and an amplitude compressed said noise filtered signal; and,
    signal adder means for additively combining said compression difference signal back again with said wide band signal to produce a de-emphasized output signal.

2. An amplitude compression circuit as set forth in claim 1 wherein said coring means comprises:
    high pass filter means for separating from said wide band electrical signal the high frequency portions thereof;
    amplitude limiting means for limiting the amplitude excursions of said high frequency portion to a fixed level whereby the amplitude limited, high frequency portion consists mainly of the noise component of said wide band electrical signal; and,
    noise signal subtraction means for separating said amplitude limited, high frequency portion from said wide band electrical signal to produce said noise filtered signal.

3. An amplitude compression circuit as set forth in claim 1 wherein said difference signal source means comprises:
    gamma circuit means responsive to said noise filtered signal for producing a compressed noise filtered signal; and
    signal subtraction means for subtracting said noise filtered signal from said compressed noise filtered signal to produce said compression difference signal.

4. An amplitude compression circuit as set forth in claim 3 and further comprising signal multiplication means interposed between said signal subtraction means and said signal adder means for multiplying said compression difference signal by a picture gamma control factor and outputting the multiplied signal to said signal adder means.

5. Color television contrast compression apparatus for television cameras having a plurality of imaging tubes for producing a corresponding plurality of video signals and comprising:
    amplitude compression circuits for each of said plurality of video signals and each comprising
        gamma circuit means responsive to the corresponding said video signal for producing a corresponding compressed video signal,
        signal subtraction means for subtracting said corresponding video signal from said compressed video signal to produce a compression difference signal,
        signal multiplication means for multiplying said compression difference signal by a picture gamma control signal to produce a controlled difference signal, and
        signal adder means for additively combining said controlled difference signal back again with the corresponding said video signal to produce a second compressed video signal having controlled de-emphasis; picture gamma control means for providing a picture gamma control signal; and, means for connecting said picture gamma control means to said signal multiplication means for each of said compression circuits whereby contrast compression of said plurality of video signals is simultaneously and uniformly controlled by said picture gamma control signal.

* * * * *